United States Patent
Niranjan et al.

(10) Patent No.: US 8,782,341 B1
(45) Date of Patent: Jul. 15, 2014

(54) EMBEDDED ADVISORY FRAMEWORK FOR STORAGE CONFIGURATION MANAGEMENT

(75) Inventors: Thirumale Niranjan, Bangalore (IN); Vitaly S. Kozlovsky, St. Petersburg (RU); Ivan V. Gumenyuk, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 190 days.

(21) Appl. No.: 13/537,244

(22) Filed: Jun. 29, 2012

(51) Int. Cl.
*G06F 3/06* (2006.01)
*G06F 11/10* (2006.01)
*G06F 11/34* (2006.01)

(52) U.S. Cl.
CPC ........ *G06F 11/1076* (2013.01); *G06F 11/3447* (2013.01)
USPC .......................................................... 711/114

(58) Field of Classification Search
None
See application file for complete search history.

(56) References Cited

U.S. PATENT DOCUMENTS

| 7,080,229 | B2 | 7/2006 | Manbert et al. | |
| 2006/0095244 | A1* | 5/2006 | Messick | 703/21 |

* cited by examiner

*Primary Examiner* — Duc Doan
(74) *Attorney, Agent, or Firm* — BainwoodHuang

(57) ABSTRACT

An improved technique involves consulting a predictive model to optimize a configuration of a data storage system. A customer at a data storage system requests a configuration optimization from a customer support center by sending values of input parameters to the customer support center. Such input parameters represent a current state of the data storage system, e.g., initial configuration. The customer support center then receives configuration parameters in response to inputting the input parameters into a predictive model running on a host computer. The customer uses the configuration parameters to define the configuration state in which the data storage system runs.

18 Claims, 10 Drawing Sheets

150

Receiving current storage system data from a particular data storage system located at a particular remote site on the network
152

Storing the current storage system data in a database that stores previous storage system data that had been received from previous data storage systems located at the remote sites on the network prior to receiving the current storage system data
154

Generating, on a host computer, a predictive model configured to output particular values of configuration management parameters to the remote site on the network in response to the host computer receiving values of input parameters that are indicative of a configuration query, the predicative model including model parameters based on the current storage system data and the previous storage system data, the particular values of the configuration parameters being indicative of an optimal configuration of the data storage system located at the remote site on the network
156

Figure 9

EMBEDDED ADVISORY FRAMEWORK FOR STORAGE CONFIGURATION MANAGEMENT

BACKGROUND

Some data storage systems include complex arrangements of storage disk arrays, configuration management interfaces, and storage processors. A system administrator faces many choices in making adjustments to the configuration of a data storage system in response to changing conditions, many of them resulting in suboptimal performance. Along these lines, the system administrator may seek advice with regard to provisioning additional storage when a storage processor generates an alert that the available storage on a particular storage disk array has fallen below a threshold.

Conventional configuration advisory tools for data storage systems use standalone applications that employ a set of heuristics based on historical configuration and failure event data. Along these lines, suppose that a data storage system needs to be configured to support a certain quantum of work of a given characteristic (called a "workload"). A system administrator will either contact a support center, which will use a standalone tool, or use a standalone tool himself. The tool will take the input characteristics of the workload, and consulting the set of heuristics that it is supplied with, will provide advice on how to configure the data storage system.

SUMMARY

Unfortunately, there are deficiencies with the above-described conventional configuration advisory tools because of their static nature and their inability to adapt to new usage paradigms Rather, the set of heuristics that the tool uses is based on a human expert interpretation of a set of failure events and configuration settings submitted by other system administrators in the past. This causes three problems. One, if the support center cannot recognize the failure event and/or the configuration settings at the time of the failure event, then it is unlikely that the tool would be able to use the set of heuristics to provide configuration settings in response to the failure event. Two, the tool is unable to learn from other deployments of the same product. Three, the tool is unable to learn from its own decisions in the past.

In contrast to the above-described conventional configuration advisory tools which are unable to adapt to new information quickly, an improved technique involves consulting a predictive model to optimize a configuration of a data storage system. A customer at a data storage system requests a configuration optimization from a customer support center by sending values of input parameters to the customer support center. Such input parameters represent a current state of the data storage system, e.g., initial configuration. The customer support center then receives configuration parameters in response to inputting the input parameters into a predictive model running on a host computer. The customer uses the configuration parameters to define the configuration state in which the data storage system runs.

Advantageously, the improved technique allows for real-time generation of optimal configurations for data storage systems. Because the predictive model is based on a flow of information from a large pool of customers, the predictive model is able to respond to any well-formulated state without excessive extrapolation. In fact, the improved techniques allow for input from different models of data storage systems (e.g., Clariion, VNX, and Isilon from EMC Corp., Hopkinton Mass.) to be combined into a single, unified model that is agnostic with respect to the model of data storage system from which a system administrator sends input parameters.

One embodiment of the improved technique is directed to a method of providing optimal configurations for data storage systems on a network in response to configuration queries from the data storage systems. The method includes receiving a configuration query from a particular data storage system, the configuration query including values of input parameters of a set of input parameters, the values of the set of input parameters being indicative of a state of the particular data storage system. The method also includes inputting the values of the input parameters into a predictive model that outputs configuration parameters in response to the host computer being provided values of the input parameters. The method further includes sending values of adjusted configuration parameters to the particular data storage system, the adjusted configuration parameters being used to provide an optimal configuration for the particular data storage system.

Additionally, some embodiments of the improved technique are directed to a system constructed and arranged to provide optimal configurations for data storage systems on a network in response to configuration queries from the data storage systems. The system includes a network interface, a memory, and a processor coupled to the memory, the processor configured to carry the method of providing optimal configurations for data storage systems on a network in response to configuration queries from the data storage systems.

Furthermore, some embodiments of the improved technique are directed to a computer program product having a non-transitory computer readable storage medium which stores code including a set of instructions to carry the method of providing optimal configurations for data storage systems on a network in response to configuration queries from the data storage systems.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 9 is a flow chart illustrating an example method of carrying out the improved technique within the electronic environment shown in FIG. 1.

DETAILED DESCRIPTION

An improved technique involves consulting a predictive model to optimize a configuration of a data storage system. A customer at a data storage system requests a configuration optimization from a customer support center by sending values of input parameters to the customer support center. Such input parameters represent a current state of the data storage system, e.g., initial configuration. The customer support center then receives configuration parameters in response to inputting the input parameters into a predictive model running on a host computer. The customer uses the configuration parameters to define the configuration state in which the data storage system runs.

Advantageously, the improved technique allows for real-time generation of opitimal configurations for data storage systems. Because the predictive model is based on a flow of information from a large pool of customers, the predictive model is able to respond to any well-formulated state without excessive extrapolation. In fact, the improved techniques allow for input from different classes of data storage systems (e.g., Clariion, VNX, and Isilon from EMC Corp., Hopkinton Mass.) to be combined into a single, unified model that is agnostic with respect to the model of data storage system from which a system administrator sends input parameters.

Figure 1:
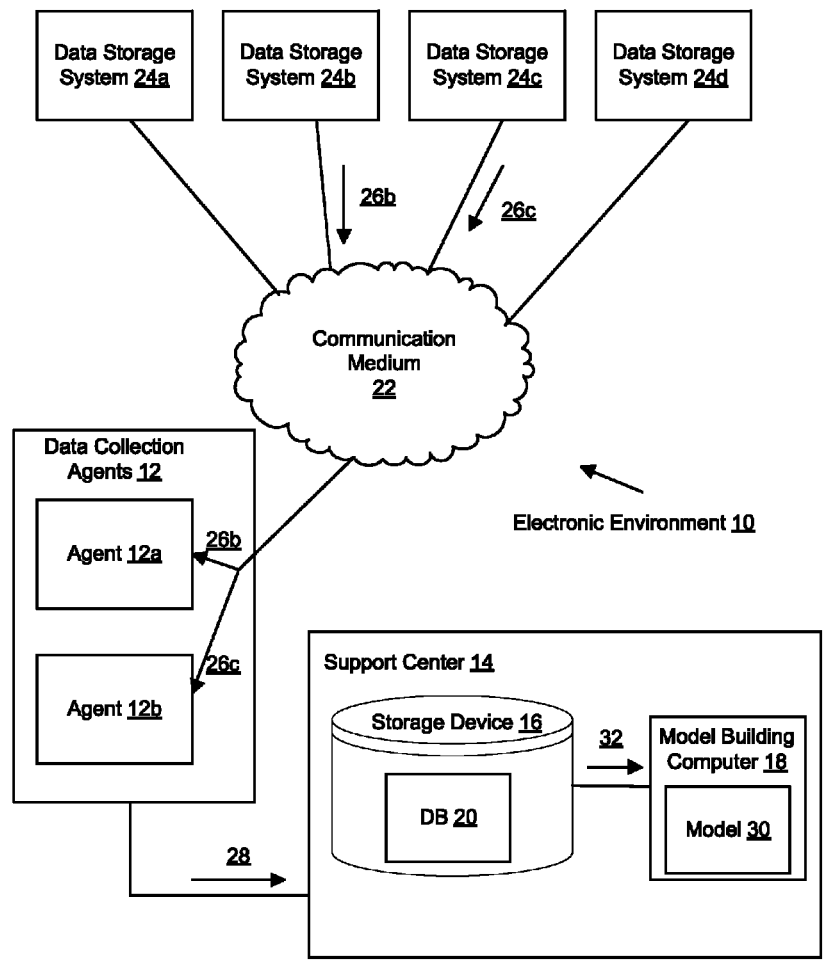
FIG. 1 is a block diagram illustrating an example electronic environment for carrying out the improved technique.

FIG. 1 illustrates an example electronic environment 10 for carrying out certain embodiments. Electronic environment 10 includes data collection agents 12, support center 14, communication medium 22, and data storage systems 24a, 24b, 24c, and 24d.

Communication medium 22 provides network connections between data collection agents 12, support center 14, and each of data storage systems 24a, 24b, 24c, and 24d. Communication medium 22 may implement a variety of protocols such as TCP/IP, UDP, ATM, Ethernet, Fibre Channel, combinations thereof, and the like. Furthermore, communication media 22 may include various components (e.g., cables, switches/routers, gateways/bridges, NAS/SAN appliances/nodes, interfaces, etc.). Moreover, the communication medium 22 is capable of having a variety of topologies (e.g., queue manager-and-spoke, ring, backbone, multi drop, point to-point, irregular, combinations thereof, and so on).

Data collection agents 12 are configured to collect various types of data from any or all of data storage systems 24a, 24b, 24c, and 24d on a periodic or continuous basis. For example, data storage system 24b sends a transaction log 26b to data collection agent 26a on a continuous basis, while data storage system 24c sends a transaction log 26c to data collection agent 26b on a periodic basis. In some arrangements, data collection agents 12 take the form of servers; in other arrangements, data collection agents 12 take the form of desktop PCs, laptops, or tablet computers.

Data collection agents 12 are further configured to produce unified data 28. It should be understood that each of data collection agents 12 is configured to process data originating from a particular class of data storage system. For example, data collection agent 12a is configured to process data from VNX systems, while data collection agent 12b is configured to process data from Isilon systems. Unified data 28 provides a common format for the disparate models of data storage systems.

Support center 14 is configured to stored unified data 28 in database 20. Support center 14 is further configured to accept commands from data collection agents 12 to build and adjust model 30 on model building computer 18. Support center 14 includes storage device 16 on which database 20 is stored and model building computer 18 which builds and adjusts model 30.

Database 20 is configured to store unified data 28 and make available unified data 28 to model building computer 18 for building model 30. Further details of database 20 will be discussed below with respect to FIG. 6.

Model building computer 18 is configured to accept commands 32 to adjust model 30 from data collection agents 12. Model building computer 18 is further configured to convert unified data 28 to model parameters for the purpose of adjusting and/or building model 30. Model building computer 18, in some arrangements, is a server; in other arrangements, model building computer 18 is a desktop computer or a laptop.

Model 30, as implemented in software code configured to be run on model building computer 18 as well as other host computers, is configured to output a value of a metric in response to model building computer 18 receiving input parameters. Model 30 is an empirical model whose output metric values depend on values of model parameters derived from data in database 20. In some arrangements, model 30 takes the mathematical form $$performance = f(configuration, current\ state, usage\ scenario),$$

where configuration represents an array of configuration parameters, current state represents an input running state including failure events, and usage scenario is an array whose elements are defined by how a data storage system is used by a customer. In general, a host computer determines a value of the configuration array by performing an optimization procedure on model 30.

It should be understood that the usage scenario array, in some arrangements, takes a particular mathematical form:

$$usage\ scenario = g(vertical, applications, workload\ characteristics, workload\ intensities).$$

The parameter vertical represents a vertical industry in which the data storage system is used (e.g., healthcare, oil & gas, financial, etc.). The parameter applications represents a particular application for which the data storage system is dedicated (e.g., online transaction processing (OLTP)/Oracle, Data Warehousing/Teradata, Email/Exchange, etc.). Workload characteristics may represent a distribution of random reads, network file system (NFS)/common internet files system (CIFS) access patterns, etc. Workload intensities may represent an input/output operations per second (IOPS) hitting the storage system. In some arrangements, workload intensities identifies a classification of data into, e.g., hot and cold data.

In some arrangements, model building computer 18 computes the function $f$ through a machine learning algorithm such as a neural network. In other arrangements, however, model building computer 18 computes the function $f$ through a statistical technique such as an expectation-maximization algorithm.

During operation, the system administrators at data storage systems 24b and 24c send data 26b and 26c, respectively, that will be used by model building computer 18 to build model 30, to data collection agents 12 via communication medium 22. Data 26b, for example, includes a current state of data storage system 24b as well as identification data of the customer using data storage system 24b. Such identification data may include a customer identifier, a vertical industry in which the customer participates, and an application that data storage system 24b serves. In some arrangements, data storage system 24b may represent the last two identifiers as a single customer class value.

Data collection agent 12a, configured to receive data from VNX data storage systems, receives data 26b; data collection agent 12b, configured to receive data from Isilon data storage systems, receives data 26c.

Data collection agents 12 process data 26b and 26c to form unified data 28. That is, each of data collection agents 12 prepares received data to take on a common format that represents all models of data storage systems.

It should be understood that more than two data storage systems may send data to data collection agents 12. In fact, it is expected that, in realistic scenarios, many data storage systems representing a gamut of classes of storage systems will send data to data collection agents 12.

Data collection agents 12 send unified data 28 to support center 14 and stores unified data in database 20. In some arrangements, unified data 28 takes the form of administrator logs and database 20 is an unstructured database such as Hadoop, made by EMC Corp. In other arrangements, unified data 28 takes the form of parameter values and database 20 is a structured database such as Greenplum, also made by EMC Corp.

At some point in time after storing unified data 28 in database 20, data collection agents 12 send a command 32 to model building computer 18 to adjust model 30 based on unified data 28. For example, model building computer 18 includes a timestamp each time it adjusts model 30. Upon receiving command 32, model building computer 18 finds all unified data 28 that has been stored in database 28 since the most recent timestamp and incorporates unified data 28 into model 30. In some arrangements, model building computer 18 performs a neural network learning cycle using unified data 28 to generate the model parameter values that define model 30.

It should be understood that, in constructing unified data 28, data collection agents 12 have enabled model 30 to be agnostic with respect to the class of data storage system sending data. In this way, model 30 represents a single model that may optimize configurations of any class of storage system.

Further details of a data collection agent 12 are discussed below with respect to FIG. 2.

Figure 2:
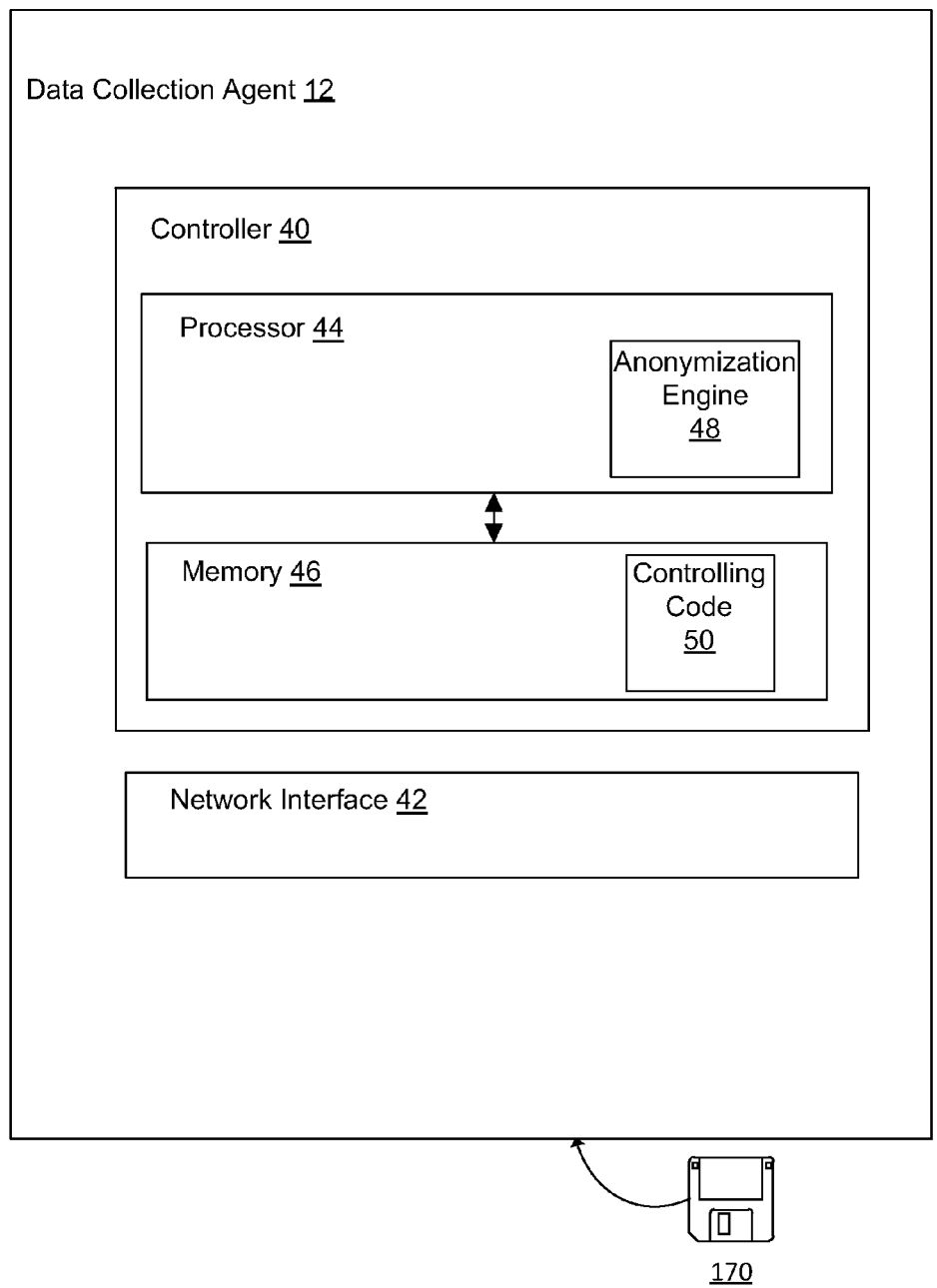
FIG. 2 is a block diagram illustrating an example data collection agent within the electronic environment shown in FIG. 1.

FIG. 2 illustrates an example data collection agent 12. Data collection agent 12 includes controller 40, which includes processor 44 and memory 46, and network interface 42.

Memory 46 is configured to store controlling code 50 which includes instructions to generate a configuration advisory tool constructed and arranged to provide optimized configurations for data storage systems located at remote sites on a network in response to configuration queries from the data storage systems. Memory 56 generally takes the form of, e.g., random access memory, flash memory, or a non-volatile memory.

Processor 44 takes the form of, but is not limited to, Intel or AMD-based MPUs, and can include a single or multi-cores each running single or multiple threads. Processor 44 is coupled to memory 46 and is configured to execute the controlling code 50 stored in memory 46. Processor 44 runs anonymization engine 48.

Anonymization engine 48 is configured, by processor 44, to identify identifying information in data sent by a data storage system and to remove that identifying information in forming unified data 28 (see FIG. 1).

Network interface 42 is constructed and arranged to send and receive data over communication medium 22. Specifically, network interface 42 is configured to receive data from the data storage systems and send unified data 28 to support center 14.

During operation, processor 44 receives data from data storage systems via network interface 42. Processor 44 then runs instructions in controlling code 50 to convert the data to unified data 28. Specifically, processor 44 adds parameter values that correspond to other models of data storage systems to the data. In some arrangements, processor 44 also runs anonymization engine 48 to find identifying information in the data and replace the identifying information with hash values. Further details of anonymization engine 48 are discussed below with respect to FIG. 7.

Processor 44 then sends unified data 28 to support center 14 and stores unified data 28 in database 20. Further details of how processor 44 stores unified data in database 20 will be discussed below with respect to FIG. 6.

After sufficient time has passed (e.g., for a periodic update of model 30), processor 44 sends command 32 (see FIG. 1) to model building computer 18 to update model 30 using unified data 28. For example, a period of updating is 48 hours.

Details of how model 30 is implemented for optimizing configurations of data storage systems are discussed below with respect to FIG. 3, FIG. 4, and FIG. 5.

Figure 3:
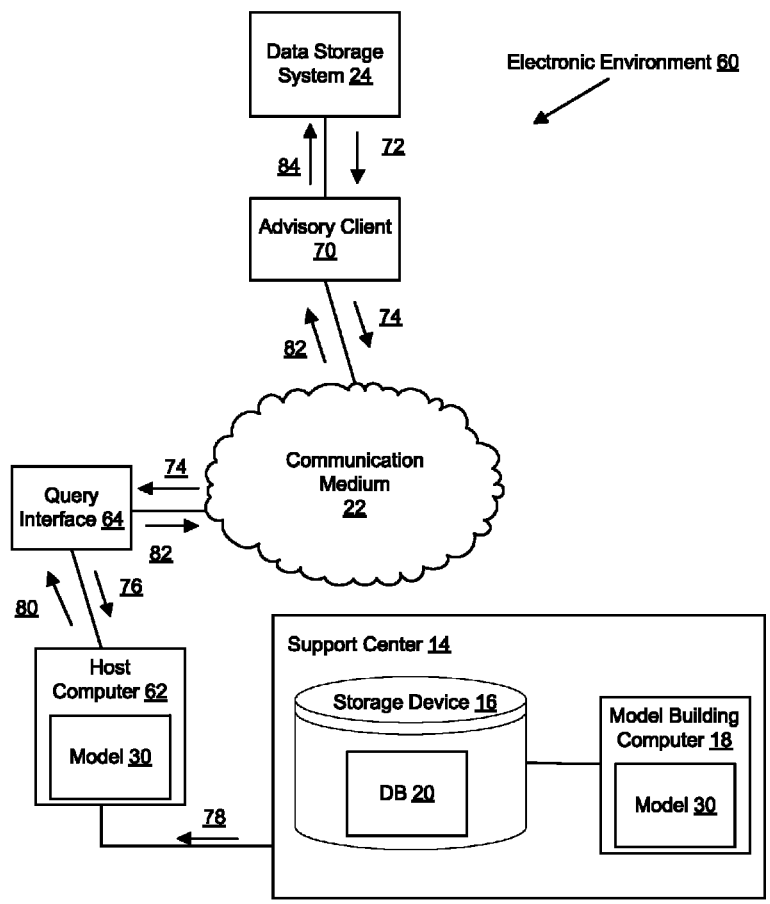
FIG. 3 is a block diagram illustrating another example electronic environment for carrying out the improved technique.

FIG. 3 illustrates an example electronic environment 60 for carrying out certain embodiments. Electronic environment 60 includes a data storage system 24, an advisory client 70, communication medium 22, query interface 64, host computer 62, and support center 14.

Advisory client 70 is constructed and arranged to provide an optimal configuration 84 to data storage system 24 in response to a configuration query 72 from the data storage system. Advisory client 70 is also constructed and arranged to send a query 74 to query interface 64 in order to communicate the query to host computer 62 running model 30. Advisory client 70 is further constructed and arranged to receive a configuration 82 from query interface 64 upon a set of optimal configuration parameter values 80 being generated by model 30. In some arrangements, advisory client 70 includes advisory software running on a computer.

It should be understood that, in many cases, query 74 is identical to query 72. In some arrangements, however, advisory client will provide additional information in query 74. For example, query 72 may take the form of an automated message containing a failure event. Query 74, then, would fill in contextual information such as the class of product that is data storage system 24, or the values of the vertical and applications parameters described above.

Query interface 64 is constructed and arranged to translate configuration query 74 from advisory client 70 into input parameter values for model 30. Query interface 64 is further constructed and arranged to transmit optimized configuration parameter values from host computer 62 to advisory client 70. In some arrangements, query interface 64 includes software running on a server.

Host computer 62 is constructed and arranged to run software instructions containing code representing model 30.

During operation, data storage system 24 sends configuration query 72 to advisory client 70 in response to, e.g., a failure event; that is, configuration query 72 is a request to solve the problem posed by the failure event. In other arrangements, configuration query 72 is indicative of a state of data storage system 24. For example, configuration query 72 may also contain a RAID protection level (e.g., RAID 5).

In some arrangements, data storage system 24 is not aware of the existence of advisory client 70. Rather, logging information which data storage system 24 produces includes records of failures and other events. Advisory client 70, in turn, is aware of the logging information; in analyzing the logging information on a periodic basis, advisory client 70 solves the problem.

Advisory client 70 provides the information from query 72 in configuration query 74 and sends configuration query 74 to query interface 64 over communication medium 22. As described above, in some arrangements, advisory client 70, in generating configuration query 74, adds information to configuration query 72 that describes a customer running data storage system 24.

Upon receiving configuration query 74, query interface 64 translates configuration query 74 into specific input parameters for model 30 running on host computer 62. For example, query interface 64 formats the information contained in query 74 into mathematical statements 76 such as values of usage scenario parameters. Model 30 is configured to recognize these mathematical statements as input.

Host computer 62, upon receiving mathematical statements 76, runs model 30 over many different sets of values of configuration parameters in order to find an optimal set of values 80 of configuration parameters. Host computer 62 finds such an optimal set through usual downhill simplex methods, for example. Host computer 62 then sends the optimal values 80 to query interface 64, whereupon query interface 64 sends a reformatted version of the optimal values 82 to advisory client 70.

Upon receiving optimal values 82, advisory client 70 sends a message 84 (e.g., through a management interface) containing the optimal values. In some arrangements, advisory client 70 adjusts the configuration parameter values of data storage system 24 according to the optimal values 82 received from query interface 64. In other arrangements, an administrator of data storage system 24 receives message 84 with recommendations of actions to take.

It should be understood that the description of electronic environment 60 as presented in FIG. 3 implies that advisory client 70 sends queries 74 to a remote host computer 62 over communication medium 22. In this way, support center 14 may charge a fee for each query. Further, support center 14 keeps model 30 on a local host computer 62. There are, however, other ways to accomplish answering configuration queries 74, such as through a subscription, as will be discussed below with respect to FIG. 4.

Figure 4:
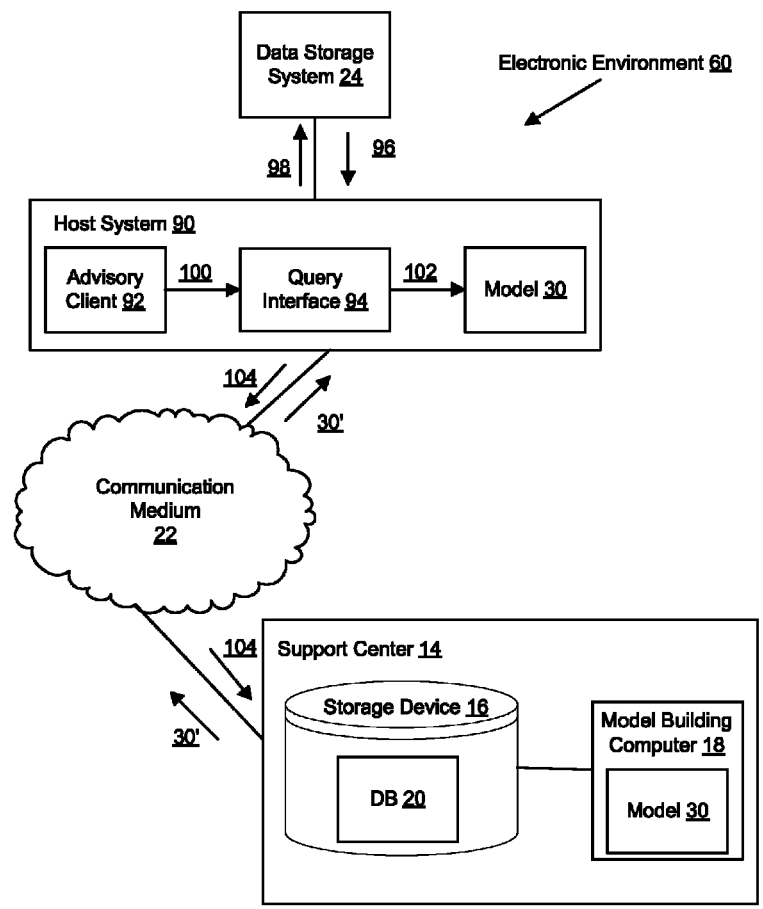
FIG. 4 is a block diagram illustrating another example electronic environment for carrying out the improved technique.

FIG. 4 illustrates another example electronic environment 60 for carrying out the improved technique. Electronic environment 60 includes a data storage system 24, a host system 90, communication medium 22, and support center 14.

Host system 90 is constructed and arranged to provide configuration optimization 98 to data storage system 24 in response to a query 96 from data storage system 24. Host system 90 includes advisory client 92, query interface 94, and model 30. It should be understood that advisory client 92 provides configuration optimization 98 without sending information from query 96 over communication medium 22. Rather, support center 14 provides model 30 to host system 90 as part of a subscription. That is, support center 14 sends model 30 over communication medium 22 at periodic intervals, with model 30 being updated at each instance.

During operation, data storage system 24 sends query 96 to host system 90 via query interface 92. Advisory client 92 receives query 96 and passes it on to query interface 94, which in turn formulates mathematical statements 102 for model 30 running on host system 90. Host system 90 in turn passes on optimized values 98 of configuration parameters to data storage system 24 as described above.

Periodically, however, host system 90 sends data 104 concerning data storage system 24 to support center 14 over communication medium 22. Support center 14 receives feedback data 104 along with data from other data storage systems, stores the data in database 20, and updates model 30 on model building computer 18 as described above. Once support center 14 updates model 30 to produce updated model 30', support center 14 sends updated model 30' to advisory client 94 via communication medium 22.

It should be understood that feedback data 104 may also be used with respect to the electronic environment 60 illustrated in FIG. 3.

Further details concerning host system 90 is discussed below with respect to FIG. 5. It should be understood that the following discussion holds for host computer 62 (see FIG. 3).

Figure 5:
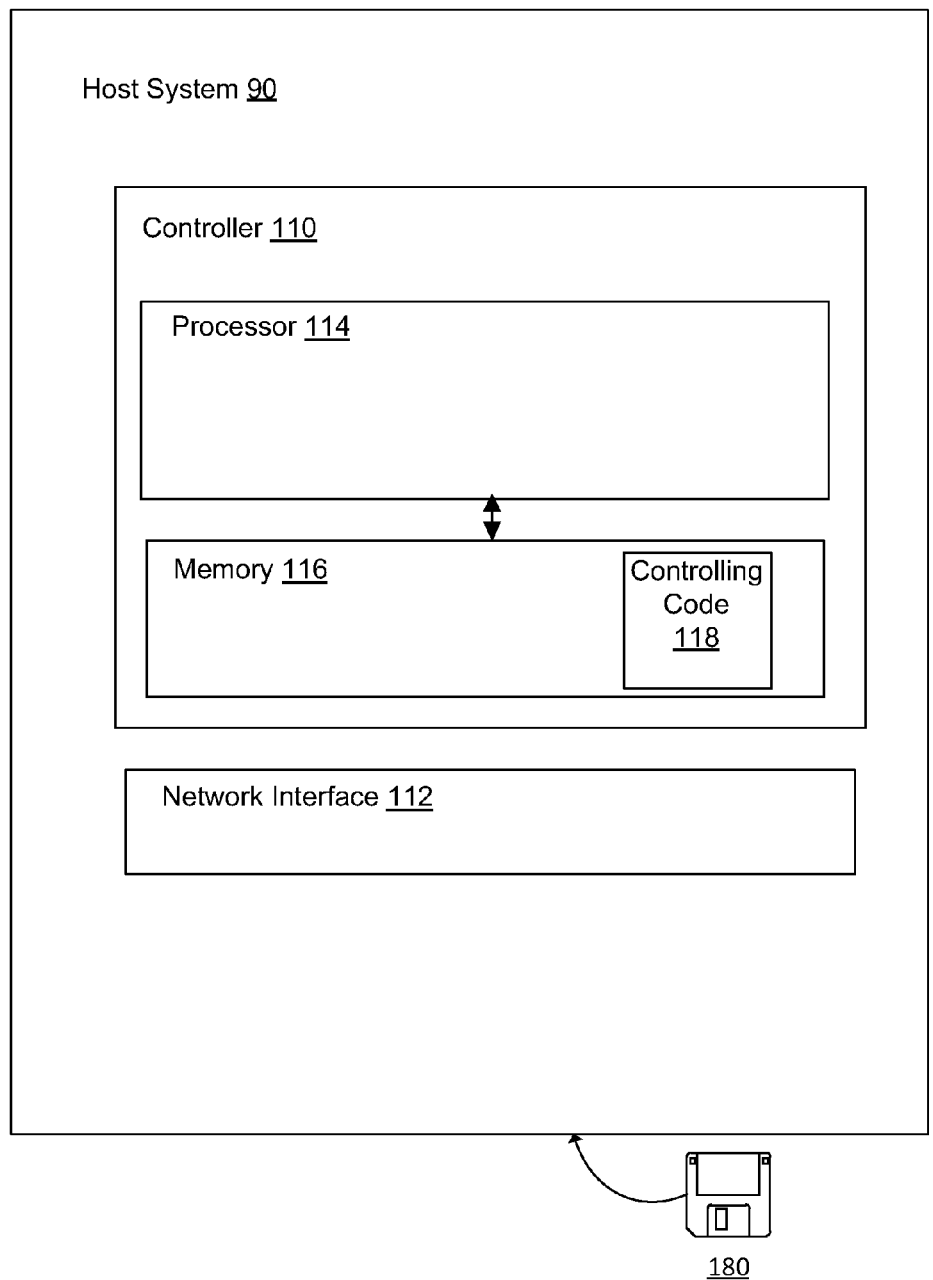
FIG. 5 is a block diagram illustrating an example advisory client within the electronic environment shown in FIGS. 3 and 4.

FIG. 5 illustrates host system 90. Host system 90 includes controller 110, which in turn includes processor 114 and memory 116, and network interface 112.

Memory 116 is configured to store controlling code 118 which includes instructions to provide optimal configurations for data storage systems on a network in response to configuration queries from the data storage systems. Memory 116 generally takes the form of, e.g., random access memory, flash memory or a non-volatile memory.

Processor 114 takes the form of, but is not limited to, Intel or AMD-based MPUs, and can include a single or multi-cores each running single or multiple threads. Processor 114 is coupled to memory 116 and is configured to execute the controlling code 118 stored in memory 116.

Network interface 112 is constructed and arranged to send and receive data over communication medium 22. Specifically, network interface 112 is configured to provide optimized configuration parameters to data storage system 24.

Figure 6:
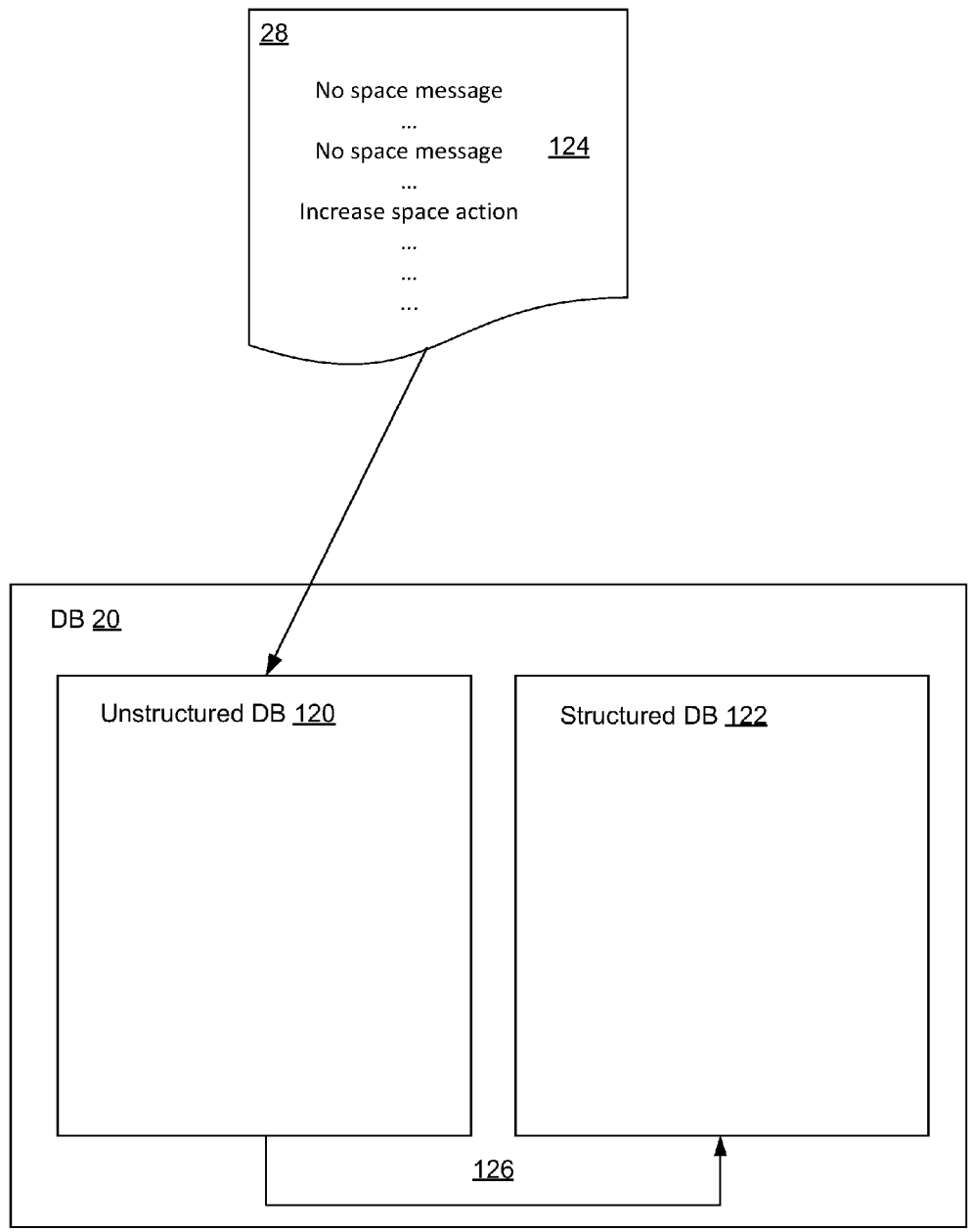
FIG. 6 is a block diagram of an example database stored within the electronic environment shown in FIG. 1.

FIG. 6 illustrates details of storing, by data collection agent 12, unified data 28 in database 20. Database 20 includes unstructured database 120 and structured database 122.

Unstructured database 120 is constructed and arranged to store unstructured data, such as that found in administrator log data 124. Unstructured data 124 contains data that cannot easily be organized into tables of entries and fields (e.g., rows and columns).

Structured database 122, on the other hand, is constructed and arranged to store structured data such as that which can be organized into entries and fields, as is found in a traditional database.

Database 20 seeks to keep historical records of administrator log data 124, yet also use such data in model 30 (see FIG. 1). For example, suppose that a data storage system has space problems on one of its LUNs; such a problem is reflected in log data 124. An administrator action that increases the size of the LUN follows; this is also shown in log data 124. Once the administrator takes the action, the log shows a subsequent absence of warning messages.

Administrator log data 124 acts as a time series of messages following a particular pattern: "symptom", "cure", and "lack of symptoms". Such a pattern forms a triad on which data collection agent 12 performs a pattern matching operation; such future triads may determine a set of actions for advisory client to take when failure events occur. This automates a human system administrator. In some arrangements, data collection agent 12 converts a set of triads 126 to structured data for inclusion in model 30.

Figure 7:
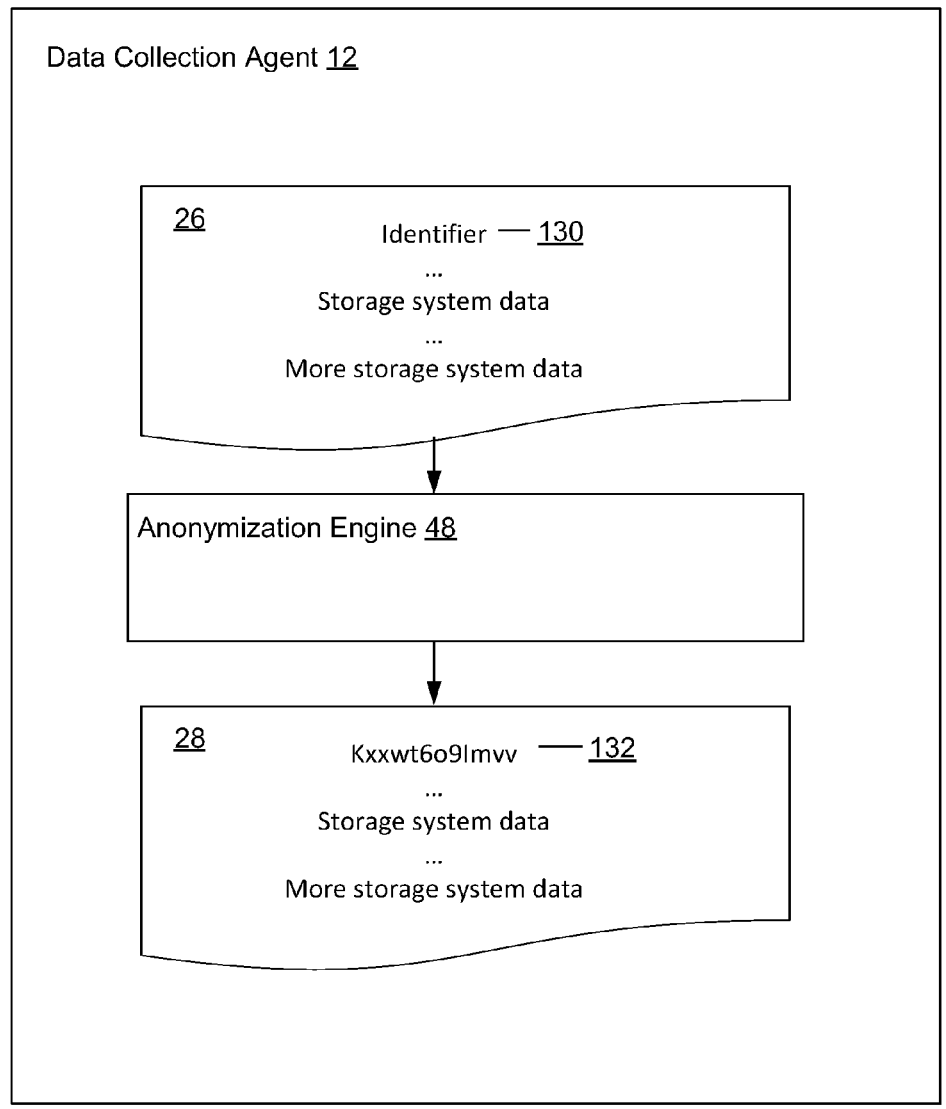
FIG. 7 is a block diagram of an example anonymizer within the data collection agent shown in FIG. 2.

FIG. 7 illustrates an anonymization process. Data collection agent 12 receives data 26 originating from data storage system 24. Data 26 includes an identifier 130 that identifies the customer who owns data storage system 24. In some arrangements, that customer would be reluctant to share data 26 if his/her identity could be deduced by an untrustworthy party.

In such a case, anonymization engine 48 locates identifiers in data 26. Such identifiers may be present, for example, in filenames and user names within data 26. Anonymization engine 48 uses a pattern-matching algorithm to locate identifiers in such places.

Anonymization engine 48 then replaces each instance of the identifier in data 26 with a cryptic symbol meaningless to support center 14. For example, anonymization engine 14 provides a hash value in place of each identifier.

Figure 8:
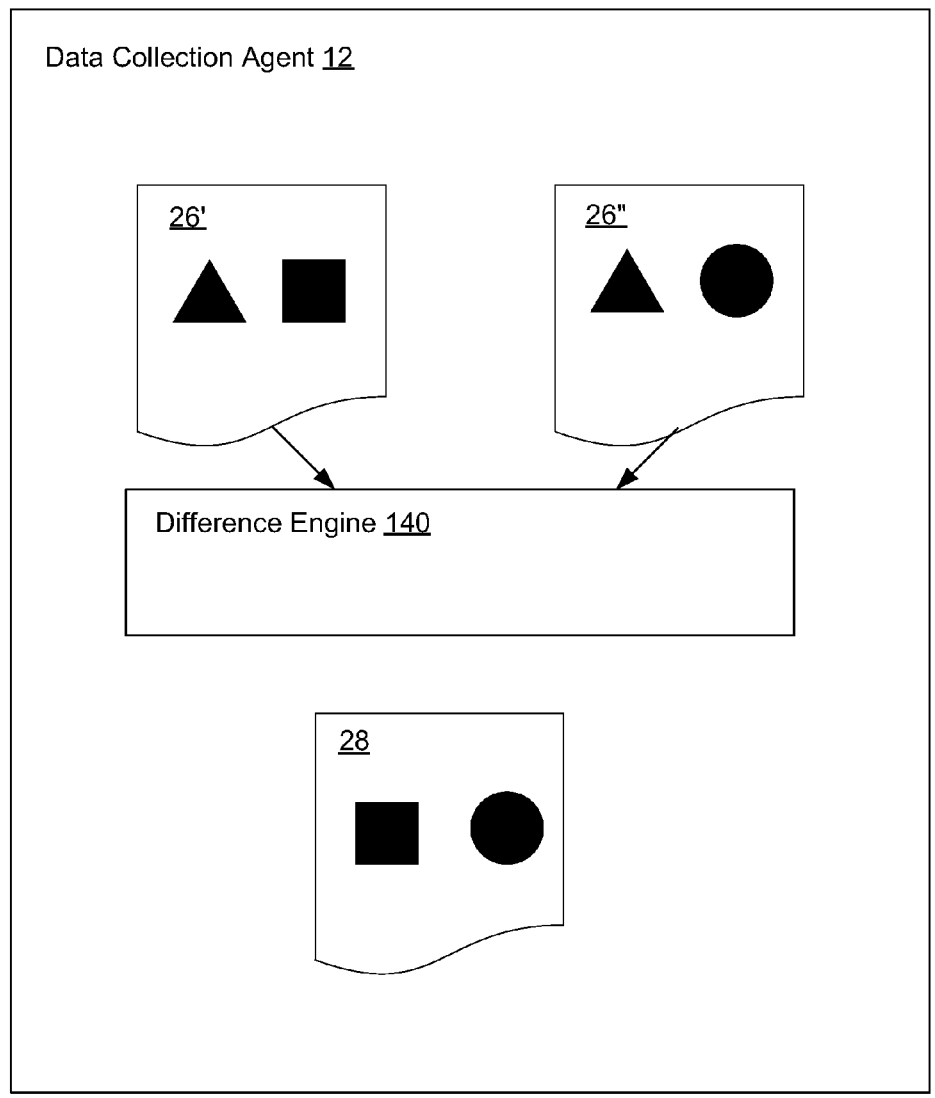
FIG. 8 is a block diagram of an example difference engine within the data collection agent shown in FIG. 2.

FIG. 8 illustrates an example operation concerning inferred data. In this case, data collection agent 12 infers data used in model 30 by considering differences in particular datasets over time.

Along these lines, suppose that data collection agent 12 receives two datasets 26' and 26", respectively, each measuring the same quantity (e.g., available disk space) at two separate instances in time. To illustrate the differencing operation, the data 26' and 26" are represented as geometrical shapes.

Data collection agent 12 includes, for this purpose, a difference engine 140 which is configured to locate datasets that may be compared at different instances of time. Difference engine 140 then presents, as inferred data within unified data 28, differenced data from datasets 26' and 26". Data collection agent 12 may use such a difference in a data change model within model 30.

FIG. 9 illustrates a method 150 of generating a configuration advisory tool constructed and arranged to provide optimized configurations for data storage systems located at remote sites on a network in response to configuration queries from the data storage systems. In step 152, current storage system data is received from a particular data storage system located at a particular remote site on the network. In step 154, the current storage system data is stored in a database that stores previous storage system data that had been received from other data storage systems located at the remote sites on the network prior to receiving the current storage system data. In step 156, a predictive model configured to output particular values of configuration management parameters to the remote site on the network in response to the host computer receiving values of input parameters that are indicative of a configuration query is generated on a host computer, the predicative model including model parameters based on the current storage system data and the previous storage system data, the particular values of the configuration parameters being indicative of an optimal configuration of the data storage system located at the remote site on the network.

Figure 10:
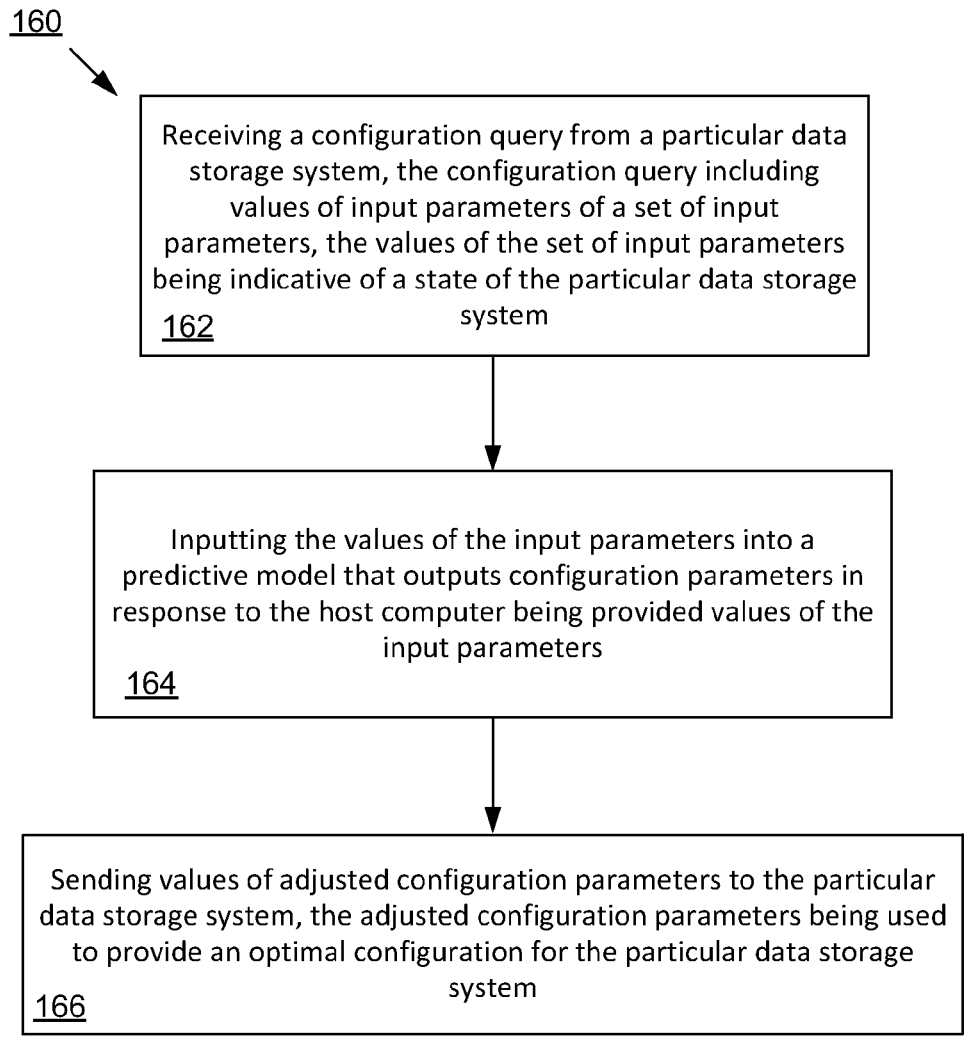
FIG. 10 is a flow chart illustrating an example method of carrying out the improved technique within the electronic environment shown in FIGS. 3 and 4.

FIG. 10 illustrates a method 160 of providing optimal configurations for data storage systems on a network in response to configuration queries from the data storage systems. In step 162, a configuration query is received from a particular data storage system, the configuration query including values of input parameters of a set of input parameters, the values of the set of input parameters being indicative of a state of the particular data storage system. In step 164, the values of the input parameters are provided to a host computer, the host computer running code that contains instructions to input the values of the input parameters into a predictive model that outputs configuration parameters in response to the host computer being provided values of the input parameters. In step 166, values of adjusted configuration parameters are received from the host computer, the adjusted configuration parameters being used to provide an optimal configuration for the particular data storage system.

While various embodiments of the invention have been particularly shown and described, it will be understood by those skilled in the art that various changes in form and details may be made therein without departing from the spirit and scope of the invention as defined by the appended claims.

For example, it should be understood that some embodiments are directed to data collection agent 12 which is constructed and arranged to generate a configuration advisory tool constructed and arranged to provide optimized configurations for data storage systems located at remote sites on a network in response to configuration queries from the data storage systems. Some embodiments are directed to a system which generates a configuration advisory tool constructed and arranged to provide optimized configurations for data storage systems located at remote sites on a network in response to configuration queries from the data storage systems. Some embodiments are directed to a process of generating a configuration advisory tool constructed and arranged to provide optimized configurations for data storage systems located at remote sites on a network in response to configuration queries from the data storage systems. Also, some embodiments are directed to a computer program product which enables computer logic to generate a configuration advisory tool constructed and arranged to provide optimized configurations for data storage systems located at remote sites on a network in response to configuration queries from the data storage systems.

It should be understood that other embodiments are directed to advisory client 70 which is constructed and arranged to providing optimal configurations for data storage systems on a network in response to configuration queries from the data storage systems. Some embodiments are directed to a system which provides optimal configurations for data storage systems on a network in response to configuration queries from the data storage systems. Some embodiments are directed to a process of providing optimal configurations for data storage systems on a network in response to configuration queries from the data storage systems. Also, some embodiments are directed to a computer program product which enables computer logic to provide optimal configurations for data storage systems on a network in response to configuration queries from the data storage systems.

In some arrangements, data collection agent 12 and/or advisory client 70 are implemented by a set of processors or other types of control/processing circuitry running software. In such arrangements, the software instructions can be delivered to data collection agent 12 and/or advisory client 70 in the form of a computer program product 170 (FIG. 2) and/or 180 (FIG. 5), respectively having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of providing optimal configurations for data storage systems on a network in response to configuration queries from the data storage systems, the method comprising:

receiving a configuration query from a particular data storage system, the configuration query including values of input parameters of a set of input parameters, the values of the set of input parameters being indicative of a state of the particular data storage system;

inputting the values of the input parameters into a predictive model that outputs configuration parameters in response to the host computer being provided values of the input parameters; and sending values of adjusted configuration parameters to the particular data storage system, the adjusted configuration parameters being used to provide an optimal configuration for the particular data storage system.

2. A method as in claim 1, wherein the particular data storage system is located at a site on the network remote from the host computer; and wherein receiving the configuration query from the particular data storage system includes:

obtaining the configuration query over the network from the site remote from the host computer.

3. A method as in claim 2, wherein the method further comprises:

providing storage system data from the particular data storage system to a model building computer that is local to the host computer in response to an application of the output configuration parameters to the particular data storage system, the storage system data being indicative of an operational history of the data storage system, the model building computer being constructed and arranged to update the code in response to receiving the storage system data.

4. A method as in claim 1, wherein the particular data storage system is located at a site on the network local to the host computer; and wherein the method further comprises:

providing storage system data from the particular data storage system to a model building computer at a central location remote from the particular data storage system in response to an application of the output configuration parameters to the particular data storage system, the storage system data being indicative of an operational history of the data storage system, the model building computer being constructed and arranged to update the code in response to receiving the storage system data to produce updated code.

5. A method as in claim 4, wherein the method further comprises:

prior to receiving the configuration query, obtaining the code from the model building computer; and after a specified amount of time has passed since obtaining the code, receiving the updated code.

6. A method as in claim 1, wherein the input parameters include a set of current configuration parameters and a set of workload characteristic parameters whose values are indicative of a current value of an efficiency measure of the data storage system;

wherein the method further comprises:

after receiving the adjusted configuration parameters from the host computer, changing the state of the particular data storage system with the values of the adjusted configuration parameters in order to produce a new value of the efficiency measure; and generating a difference between the new value of the efficiency measure and the current value of the efficiency measure, the difference being indicative of a degree of configuration optimization achieved by the predictive model.

7. A system constructed and arranged to provide optimal configurations for data storage systems located at remote sites on a network in response to configuration queries from the data storage systems, the system comprising:

a network interface;

memory; and a controller including controlling circuitry coupled to the memory, the controlling circuitry being constructed and arranged to:

receive a configuration query from a particular data storage system, the configuration query including values of input parameters of a set of input parameters, the values of the set of input parameters being indicative of a state of the particular data storage system;

input the values of the input parameters into a predictive model that outputs configuration parameters in response to the host computer being provided values of the input parameters; and send values of adjusted configuration parameters to the particular data storage system, the adjusted configuration parameters being used to provide an optimal configuration for the particular data storage system.

8. A system as in claim 7, wherein the particular data storage system is located at a site on the network remote from the host computer; and wherein receiving the configuration query from the particular data storage system includes:

obtaining the configuration query over the network from the site remote from the host computer.

9. A system as in claim 8, wherein the controlling circuitry is further constructed and arranged to:

provide storage system data from the particular data storage system to a model building computer that is local to the host computer in response to an application of the output configuration parameters to the particular data storage system, the storage system data being indicative of an operational history of the data storage system, the model building computer being constructed and arranged to update the code in response to receiving the storage system data.

10. A system as in claim 7, wherein the particular data storage system is located at a site on the network local to the host computer; and wherein the controlling circuitry is further constructed and arranged to:

provide storage system data from the particular data storage system to a model building computer at a central location remote from the particular data storage system in response to an application of the output configuration parameters to the particular data storage system, the storage system data being indicative of an operational history of the data storage system, the model building computer being constructed and arranged to update the code in response to receiving the storage system data to produce updated code.

11. A system as in claim 10, wherein the controlling circuitry is further constructed and arranged to:

prior to receiving the configuration query, obtain the code from the model building computer; and after a specified amount of time has passed since obtaining the code, receive the updated code.

12. A system as in claim 7, wherein the input parameters include a set of current configuration parameters and a set of workload characteristic parameters whose values are indicative of a current value of an efficiency measure of the data storage system; and wherein the controlling circuitry is further constructed and arranged to:

after receiving the adjusted configuration parameters from the host computer, change the state of the particular data storage system with the values of the adjusted configuration parameters in order to produce a new value of the efficiency measure; and generate a difference between the new value of the efficiency measure and the current value of the efficiency measure, the difference being indicative of a degree of configuration optimization achieved by the predictive model.

13. A computer program product having a non-transitory, computer-readable storage medium which stores code to provide optimal configurations for data storage systems located at remote sites on a network in response to configuration queries from the data storage systems, the code including instructions to:

receive a configuration query from a particular data storage system, the configuration query including values of input parameters of a set of input parameters, the values of the set of input parameters being indicative of a state of the particular data storage system;

input the values of the input parameters into a predictive model that outputs configuration parameters in response to the host computer being provided values of the input parameters; and send values of adjusted configuration parameters to the particular data storage system, the adjusted configuration parameters being used to provide an optimal configuration for the particular data storage system.

14. A computer program product as in claim 13,
wherein the particular data storage system is located at a site on the network remote from the host computer; and
wherein receiving the configuration query from the particular data storage system includes:
obtaining the configuration query over the network from the site remote from the host computer.

15. A computer program product as in claim 14,
wherein the code includes further instructions to:
provide storage system data from the particular data storage system to a model building computer that is local to the host computer in response to an application of the output configuration parameters to the particular data storage system, the storage system data being indicative of an operational history of the data storage system, the model building computer being constructed and arranged to update the code in response to receiving the storage system data.

16. A computer program product as in claim 13,
wherein the particular data storage system is located at a site on the network local to the host computer; and
wherein the code includes further instructions to:
provide storage system data from the particular data storage system to a model building computer at a central location remote from the particular data storage system in response to an application of the output configuration parameters to the particular data storage system, the storage system data being indicative of an operational history of the data storage system, the model building computer being constructed and arranged to update the code in response to receiving the storage system data to produce updated code.

17. A computer program product as in claim 16,
wherein the code includes further instructions to:
prior to receiving the configuration query, obtain the code from the model building computer; and
after a specified amount of time has passed since obtaining the code, receive the updated code.

18. A computer program product as in claim 13,
wherein the input parameters include a set of current configuration parameters and a set of workload characteristic parameters whose values are indicative of a current value of an efficiency measure of the data storage system; and
wherein the code includes further instructions to:
after receiving the adjusted configuration parameters from the host computer, change the state of the particular data storage system with the values of the adjusted configuration parameters in order to produce a new value of the efficiency measure; and
generate a difference between the new value of the efficiency measure and the current value of the efficiency measure, the difference being indicative of a degree of configuration optimization achieved by the predictive model.

* * * * *